United States Patent
Lynch et al.

(10) Patent No.: US 8,890,349 B1
(45) Date of Patent: Nov. 18, 2014

(54) LOAD REDUCTION SYSTEM AND METHOD FOR A WIND POWER UNIT

(71) Applicant: Northern Power Systems Utility Scale, Inc., Barre, VT (US)

(72) Inventors: Jonathan A. Lynch, St. Johnsbury, VT (US); Garrett L. Bywaters, Waitsfield, PA (US)

(73) Assignee: Northern Power Systems, Inc., Barre, VT (US)

( * ) Notice: Subject to any disclaimer, the term of this patent is extended or adjusted under 35 U.S.C. 154(b) by 28 days.

(21) Appl. No.: 13/746,123

(22) Filed: Jan. 21, 2013

Related U.S. Application Data (60) Provisional application No. 61/588,214, filed on Jan. 19, 2012.

(51) Int. Cl.
*F03D 9/00* (2006.01)
*H02P 9/04* (2006.01)

(52) U.S. Cl.
CPC ..................................... *H02P 9/04* (2013.01)
USPC .............................................. 290/44; 290/55

(58) Field of Classification Search
CPC ..... Y02E 10/72; Y02E 10/723; F03D 7/0204; F03D 7/0224; F03D 7/042; Y02B 10/30; F05B 2270/32; F05B 2270/329; H02P 9/004
USPC ..................................................... 290/44, 55
See application file for complete search history.

(56) References Cited

U.S. PATENT DOCUMENTS

| | | | | |
|---|---|---|---|---|
| 4,993,348 | A * | 2/1991 | Wald | 114/265 |
| 5,289,041 | A * | 2/1994 | Holley | 290/44 |
| 6,441,507 | B1 | 8/2002 | Deering et al. | 290/44 |
| 7,175,389 | B2 | 2/2007 | Moroz | 416/1 |
| 7,244,100 | B2 * | 7/2007 | Yoshida | 416/9 |
| 7,418,820 | B2 | 9/2008 | Harvey | 60/487 |
| 7,602,075 | B2 * | 10/2009 | Erdman et al. | 290/44 |
| 7,939,961 | B1 * | 5/2011 | Bonnet | 290/55 |
| 8,076,789 | B2 * | 12/2011 | Miller | 290/44 |
| 8,080,891 | B2 | 12/2011 | Schramm et al. | 290/44 |
| 8,093,738 | B2 * | 1/2012 | Stiesdal | 290/44 |
| 8,109,722 | B2 * | 2/2012 | Gamble et al. | 416/1 |
| 8,178,986 | B2 * | 5/2012 | Vyas et al. | 290/44 |
| 8,183,707 | B2 * | 5/2012 | Siebers et al. | 290/53 |
| 8,212,373 | B2 * | 7/2012 | Wittekind et al. | 290/44 |
| 8,410,625 | B2 * | 4/2013 | Stiesdal | 290/44 |

(Continued)

FOREIGN PATENT DOCUMENTS

| | | |
|---|---|---|
| EP | 20207 A1 | 12/1980 |
| EP | 2133563 A1 | 12/2009 |

(Continued)

OTHER PUBLICATIONS

First Office Action dated Jan. 3, 2014, in connection with related U.S. Appl. No. 13/315,907, filed Dec. 9, 2011.

(Continued)

*Primary Examiner* — Pedro J Cuevas
(74) *Attorney, Agent, or Firm* — Downs Rachlin Martin PLLC (57) ABSTRACT

A wind power unit control system that dynamically corrects for yaw angle error based on sensed conditions and switches operation of the wind power unit to a correct operating mode based on its current operational state and the sensed conditions.

35 Claims, 6 Drawing Sheets

(56) References Cited

U.S. PATENT DOCUMENTS

| | | | |
|---|---|---|---|
| 8,577,822 B2* | 11/2013 | Kusiak et al. | 706/45 |
| 8,649,911 B2* | 2/2014 | Avagliano et al. | 700/291 |
| 2005/0169755 A1* | 8/2005 | Yoshida | 416/132 B |
| 2006/0153672 A1* | 7/2006 | Davis | 415/4.2 |
| 2007/0166147 A1* | 7/2007 | Merswolke et al. | 415/4.1 |
| 2007/0170724 A1 | 7/2007 | Calley | 290/44 |
| 2007/0187954 A1 | 8/2007 | Struve et al. | 290/44 |
| 2009/0039651 A1* | 2/2009 | Stiesdal | 290/44 |
| 2009/0317250 A1* | 12/2009 | Gamble et al. | 416/1 |
| 2010/0152905 A1* | 6/2010 | Kusiak | 700/276 |
| 2010/0194114 A1 | 8/2010 | Pechlivanoglou et al. | 290/55 |
| 2010/0215502 A1 | 8/2010 | Harrison | 416/205 |
| 2010/0329842 A1* | 12/2010 | Stiesdal | 415/4.1 |
| 2011/0178771 A1* | 7/2011 | Miranda | 702/182 |
| 2011/0187108 A1 | 8/2011 | Wakasa | 290/44 |
| 2011/0299975 A1 | 12/2011 | Pechlivanoglou | 415/123 |
| 2012/0025528 A1* | 2/2012 | Sipila et al. | 290/44 |
| 2012/0049520 A1* | 3/2012 | Stiesdal | 290/44 |
| 2012/0074712 A1 | 3/2012 | Bursal | 290/55 |
| 2012/0139248 A1* | 6/2012 | Bertolotti | 290/44 |
| 2012/0263601 A1* | 10/2012 | Baker et al. | 416/223 R |
| 2013/0099497 A1* | 4/2013 | Bowyer et al. | 290/44 |
| 2013/0272877 A1* | 10/2013 | Andersen et al. | 416/1 |
| 2014/0003939 A1* | 1/2014 | Adams et al. | 416/1 |
| 2014/0037448 A1* | 2/2014 | FU et al. | 416/1 |
| 2014/0167415 A1* | 6/2014 | Mykhaylyshyn | 290/44 |
| 2014/0169964 A1* | 6/2014 | Kumar et al. | 416/1 |
| 2014/0186176 A1* | 7/2014 | Andersen et al. | 416/1 |

FOREIGN PATENT DOCUMENTS

| | | |
|---|---|---|
| EP | 2306005 A2 | 4/2011 |
| WO | 2008049426 A1 | 5/2008 |
| WO | 2009068035 A2 | 6/2009 |
| WO | 2011157342 A2 | 12/2011 |
| WO | PCT/US2011/064231 | 4/2012 |

OTHER PUBLICATIONS

U.S. Appl. No. 13/315,907, filed Dec. 9, 2011.

T.F. Pedersen et al., Spinner Anemometry—an Innovative Wind Measurement Concept; www.metek.de/ .../ usonic-1-spinner.html? ... Spinner%20Anemometry . . . ; pp. 1-8; 2009.

Notice of Allowance date mailed May 29, 2014, in connection with related U.S. Appl. No. 13/315,907, filed Dec. 9, 2011.

\* cited by examiner

LOAD REDUCTION SYSTEM AND METHOD FOR A WIND POWER UNIT

FIELD OF THE INVENTION

The present invention generally relates to the field of wind turbine control methods. In particular, the present invention is directed to a load reduction system and method for a wind power unit.

BACKGROUND

Wind power units ("WPUs") generally employ a number of methods to limit rotor and overall structural loads for the entire set of wind and operating conditions predicted over the WPU operating life at a particular site. Multiple control methods can be used to manage loads during operation, including blade collective pitch, individual blade pitch, and yaw axis control to align the WPU with the prevailing wind inflow direction.

Yaw control systems typically employ one or more wind direction sensors mounted on the nacelle cover behind the rotor, or less commonly on a separate tower assembly mounted on an upwind side of the blade rotor hub. Conventionally, the WPU control system uses yaw error information to operate a yaw control system that typically uses electric or hydraulic motors to rotate the nacelle relative to the tower support. To control required actuation loads and to limit additional loads caused by high yaw rates, WPUs are typically designed with low yaw angular rates.

Because of the low yaw rates, during operation in dynamic wind conditions it is possible to encounter conditions where the WPU is operating at its full rated rotor speed and with a large yaw angle error. As the yaw angle increases, blade and tower top loads significantly in excess of normal operating loads can be introduced. Such a high yaw angle operating load can be a defining critical load for the turbine structural design. There is thus a need for improved control methods and systems to anticipate the onset of such load conditions and invoke a control regime to protect against undesirable load conditions that may otherwise result.

SUMMARY OF DISCLOSURE

In one implementation, the present disclosure is directed to a method for controlling a wind power unit, having a support structure and a control system. The method includes controlling the wind power unit to operate in a current operating mode, the current operating mode being one of a plurality of operating modes wherein the plurality of operating modes comprises a normal operation mode and a shutdown mode, the mode being selected by the control system in response to sensed parameters indicative of wind power unit state; sensing the parameters with a plurality of sensors; determining a correct operating mode corresponding to one of the plurality of operating modes based on the sensed parameters; and switching the wind power unit to the correct operating mode when the correct operating mode varies from the current operating mode.

In another implementation, the present disclosure is directed to a method for controlling a wind power unit. The method includes operating the wind power unit in a current operating mode selected from a plurality of operating modes comprising a normal operation mode and a shutdown mode; sensing parameters indicative of the wind power unit state; determining a correct operating mode corresponding to one of the plurality of operating modes based on the sensed parameters; switching the wind power unit to the correct operating mode when the correct operating mode varies from the current operating mode; and designating the correct operating mode as the current operating mode.

In still another implementation, the present disclosure is directed to a wind power unit control system. The wind power unit control system includes a wind speed sensor for providing a first value representative of a wind speed; at least a second sensor for determining a second value representative of the yaw angle error; and a control unit receiving inputs from the sensors and including a processor and a memory containing a set of instructions for controlling the wind power unit, wherein the set of instructions direct the processor to: control the wind power unit to operate in a current operating mode, the current operating mode being one of a plurality of operating modes wherein the plurality of operating modes comprises a normal operation mode and a shutdown mode, the mode being selected by the control system in response to sensed parameters indicative of the wind power unit state; determine a correct operating mode corresponding to one of the plurality of operating modes based on the first and second values; and switch the wind power unit to the correct operating mode when the correct operating mode varies from the current operating mode.

DESCRIPTION OF EXEMPLARY EMBODIMENTS

A system and method is disclosed for monitoring and reducing loads on a wind power unit (WPU) and its associated tower and foundation. The load reduction system and method uses a control system designed and configured to sense various environmental and operating conditions and to operate the WPU in one or more preprogrammed modes so as to keep loads on the WPU at a safe level.

Figure 1:
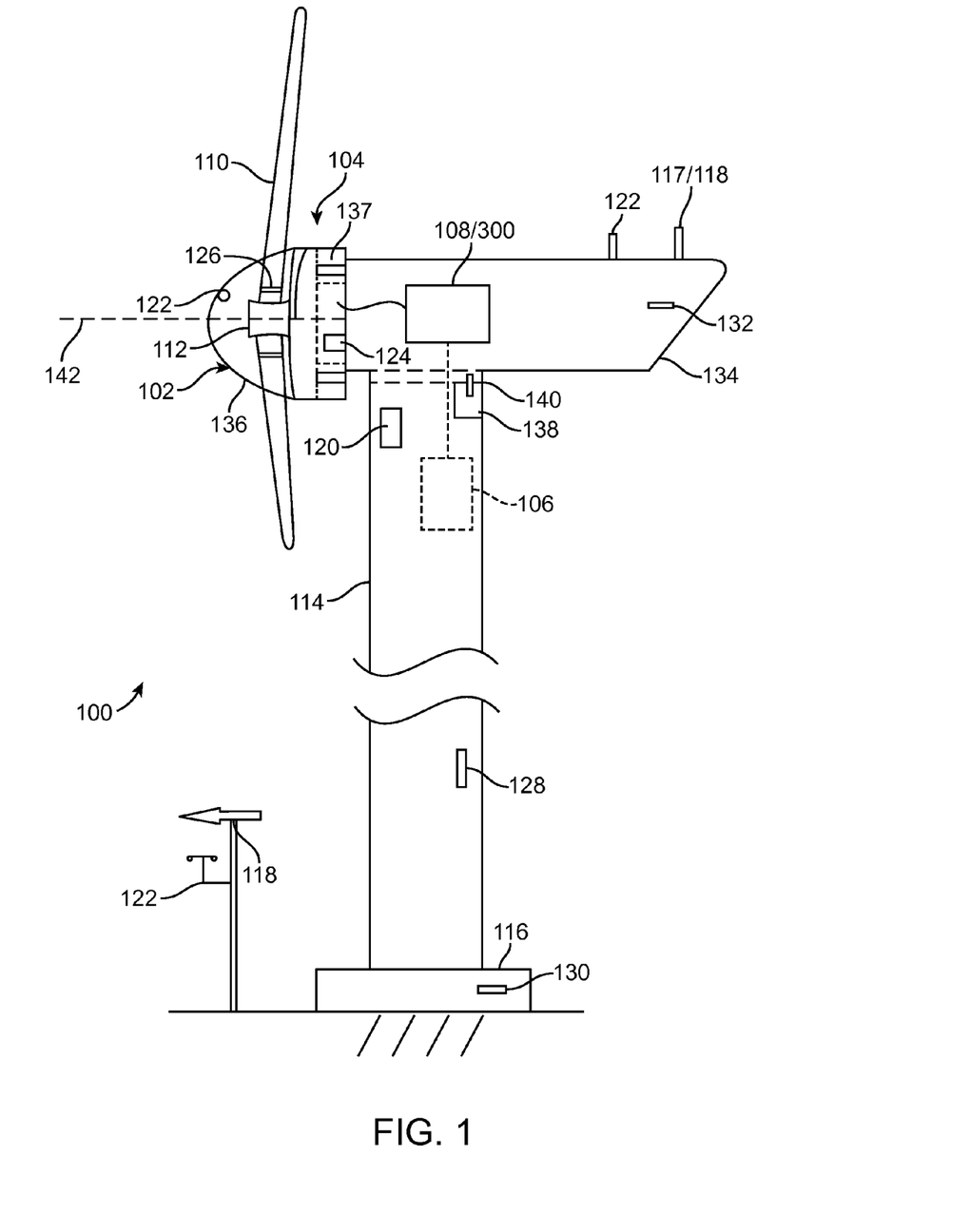
FIG. 1 is a schematic elevation view of an exemplary wind power unit.

As illustrated in FIG. 1, an exemplary WPU 100 may employ a number of systems, such as, blade pitch control systems 102, braking control systems 104, and yaw axis control systems 106 that serve to limit rotor speed and reduce structural loads that can arise during certain environmental and operating conditions. These individual control systems may be incorporated within or may operate under the control of an overall control system 108. While the yaw axis control system is designed, at least in part, to alleviate structural loading on the WPU blades 110, drivetrain 112, tower 114 and foundations 116, as discussed, it may not correct the orientation of the WPU quickly enough to avoid structural loading that may damage the WPU, thus a more comprehensive approach is necessary.

Turning first to the operation of the yaw axis control system, it may gather information from a yaw error indicator 117 and/or one or more wind direction sensors 118, such as a wind sock, wind vane, three-dimensional sonic anemometers, sonic detection system (SODAR), or laser detection system (LIDAR), for use in controlling the orientation of the WPU. Other typical sensors may optionally include a tower motion sensor 120, a wind speed sensor 122, a rotor speed sensor 124 and strain gauges 126, 128, 130, 132, for determining loads on blades, the tower, foundation and/or nacelle, respectively. In one embodiment, the yaw error indicator may comprise a wind direction sensor mounted on and aligned with the nacelle so that a zero degree reading indicates that the nacelle is aligned with the wind, while a positive or negative angle reading indicates there is a yaw error to one side or the other. The raw output of the indicator may be filtered in the turbine controller or other suitable processor to reduce noise and fluctuation often present in the raw data. Depending on the type of sensor(s) used and whether the WPU employs an upwind or a downwind rotor configuration, the yaw error indicator 117, wind direction sensor 118 and/or wind speed sensor 122 may be located, for example, on the nacelle cover 134, on the nosecone 136 of the rotor 137, or on a separate tower on the upwind side of the blade rotor hub. These sensors are generally configured to be fixed and aligned with the wind turbine structure, rotating with the WPU about its yaw axis, and measure the yaw angle error between the WPU rotor axis 142 and the measured wind direction. Alternatively, a wind direction sensor and/or wind speed sensor can be mounted in a fixed position relative to the ground, and the output signal compared to a measured yaw angle of the WPU axis of rotation also measured with respect to the ground. The yaw axis control system may additionally employ either digital yaw error indicators in combination with the wind direction sensor to determine the yaw error or may determine the yaw error as a relative error angle between the sensed wind direction and the WPU nacelle orientation.

Based on yaw error information, the yaw axis control system operates yaw control motors 138 to rotate the WPU. A yaw control system typically includes pinions driving a ring gear 140 to yaw the WPU. However, due to the relatively slow yaw angular change rates as mentioned, typically at or below about one degree per second, dynamic wind conditions can result in situations where the WPU encounters relatively large wind speeds with a large prevailing yaw direction error with respect to the rotor axis. As the yaw error increases to, for example, greater than about 25° for a typical large WPU, blade and tower loads in excess of normal operating loads, and potentially sufficient to damage the WPU, may be introduced.

Figure 2:
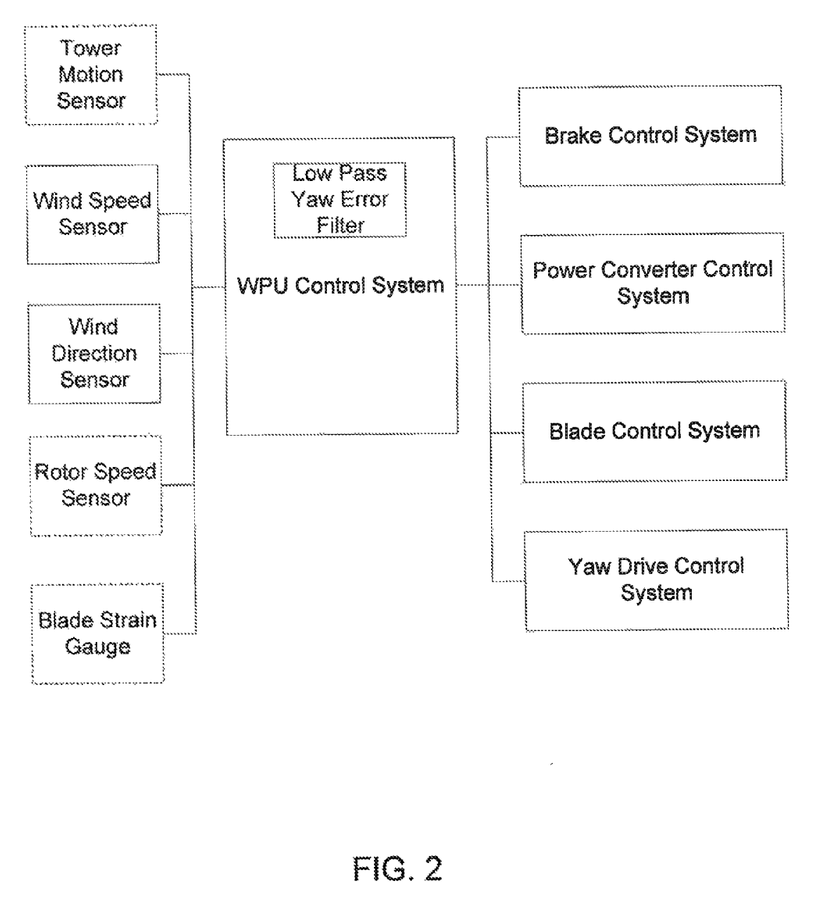
FIG. 2 is block diagram illustrating an exemplary control system according to an embodiment of the present invention.

To protect the WPU from such damaging loads, exemplary control systems of embodiments described in the present disclosure determine, based on sensed and/or calculated parameters, whether to execute measures to protect the WPU before it begins to experience potentially damaging excess load conditions. In one exemplary embodiment, and as shown in FIG. 2, the WPU control system can use wind direction and wind speed to infer the loading on the WPU and consequently what course of action is necessary to protect the WPU. To determine yaw error, in one embodiment, a filtered yaw error is calculated using a low pass filter function, such as an exponentially weighted moving average function of the wind direction measurements and the WPU nacelle orientation. Wind speed may be determined via several methodologies known in the art such as cup, laser, or sonic anemometers, which may provide an instantaneous wind speed or may be used to provide a filtered wind speed that is an averaged wind speed computed over some predetermined amount of time.

In operation, if the WPU is experiencing wind speeds of a certain value concurrently with a filtered yaw error above a selected magnitude, which corresponds to a predicted certain amount of loading on the WPU, then the WPU control system would switch operation of the WPU from its current operating mode to a correct operating mode for the conditions. For example, in addition to a normal operation mode, other operating modes may include, but are not limited to, a stop or shutdown mode or a reduced load mode. Also, once operation is switched to the correct operating mode, the correct operating mode becomes the current operating mode for the next control iteration.

Figure 3:
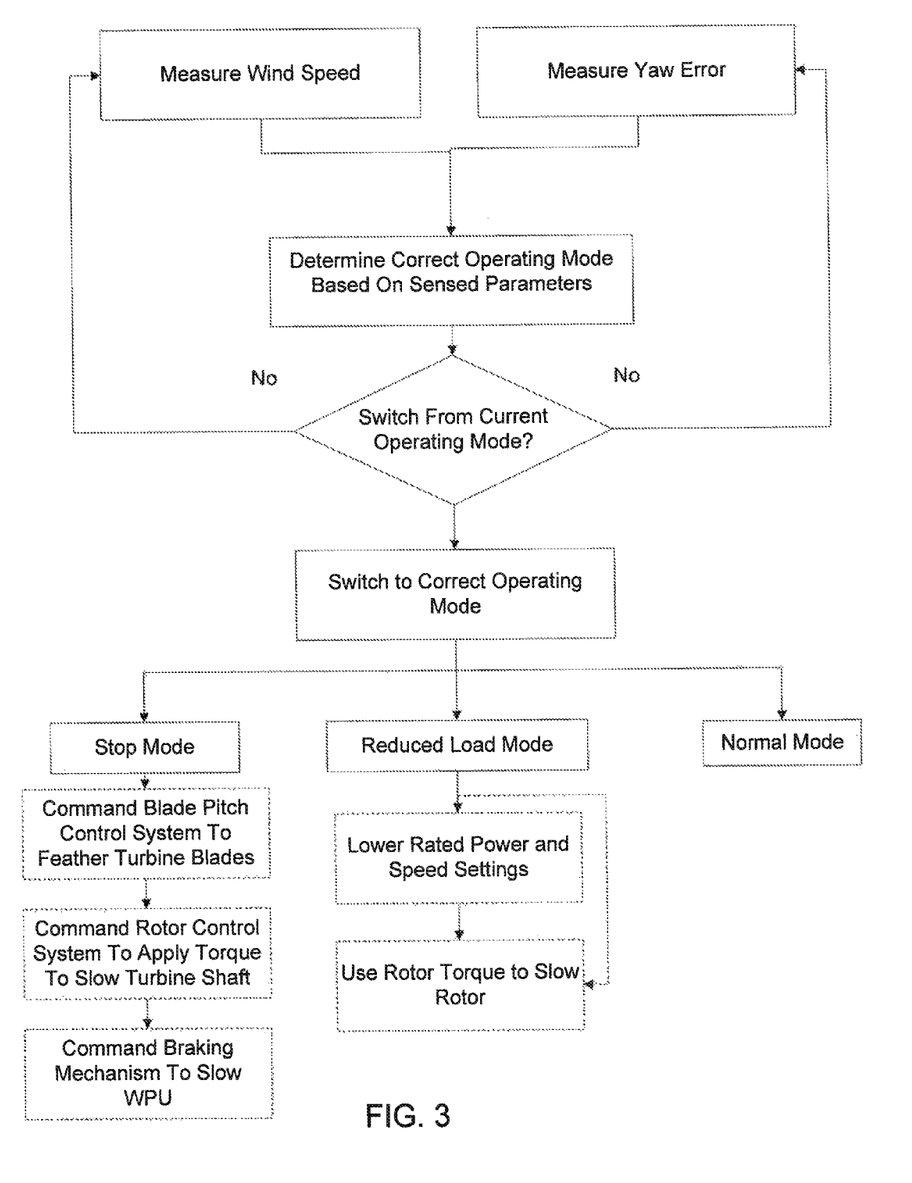
FIG. 3 is a flow diagram illustrating a process flow according to an embodiment of the present invention.

In one example, and as shown in FIGS. 2 and 3, the WPU control system may enter the shutdown mode as a function of the measurements from the sensors employed with the WPU control system, e.g., a high wind measurement coupled with a high yaw error determination. In shutdown mode, WPU control system may command the blade control system to slowly pitch the WPU blades toward a no load condition, i.e., the feathered position (away from the wind) or the stall position (towards the wind) and may additionally command the power converter control system to apply a rotor torque to the WPU shaft that is a function of the current shaft rotational speed. In an exemplary embodiment, the blades slowly pitch at a rate of about 1-4 degrees per second or more specifically about 2 degrees per second. Alternatively, for a unit with a maximum pitch rate of about 8-10 degrees per second, the pitch rate to a no load condition may be at about 30% of the maximum pitch rate. In some embodiments, the applied rotor torque may be approximately equal to 50% to 110% of the rated output torque for the WPU, while in other embodiments the applied rotor torque is only up to the full rated output torque or slightly less (e.g. 95%). These actions will at least sufficiently slow the WPU to a point at which the yaw error control system can reposition the turbine into the wind and the WPU may be allowed to resume normal operation. In some instances and depending on operating conditions, the WPU rotor may be brought to a complete stop in shutdown mode before resuming normal operation.

Alternatively, the WPU control system may direct the WPU into a reduced power mode or a reduced speed mode (for simplicity, referred to herein as reduced load mode) when certain environmental and operational load conditions exist. Reduced load mode may be appropriate when the loading on the WPU tower and foundation does not present an immediate danger to the WPU, but the loads should be reduced to a safer level to avoid long term accumulation of damage. As an example, reduced load mode includes reducing output power and/or rotor speed of the WPU by changing turbine power and/or speed limit settings or set points below values used for normal operation. Such a change may be implemented by a person of ordinary skill, for example, through an alternative control path (e.g., Reduced Load Mode path in FIG. 2) for corresponding settings in the turbine controller, power converter, and/or pitch control system. After changing the settings, a reduction of rotor speed may be effectuated, for example, by applying torque to the rotor. This operation would slow the turbine rotor speed at certain yaw angle error conditions while permitting the WPU to remain online and generating power. When the WPU is at reduced power, the yaw control system can reposition the turbine into the wind so that the WPU may be allowed to resume operation at its fully rated power output. The reduction of rotor speed reduces the loads introduced by operation of the WPU at relatively large yaw angle errors, thus this control method controls these loads without resorting to a full turbine shutdown. Other options for placing the WPU into a reduced load mode include, but are not limited to, applying a brake or feathering the WPU blades.

Figure 4:
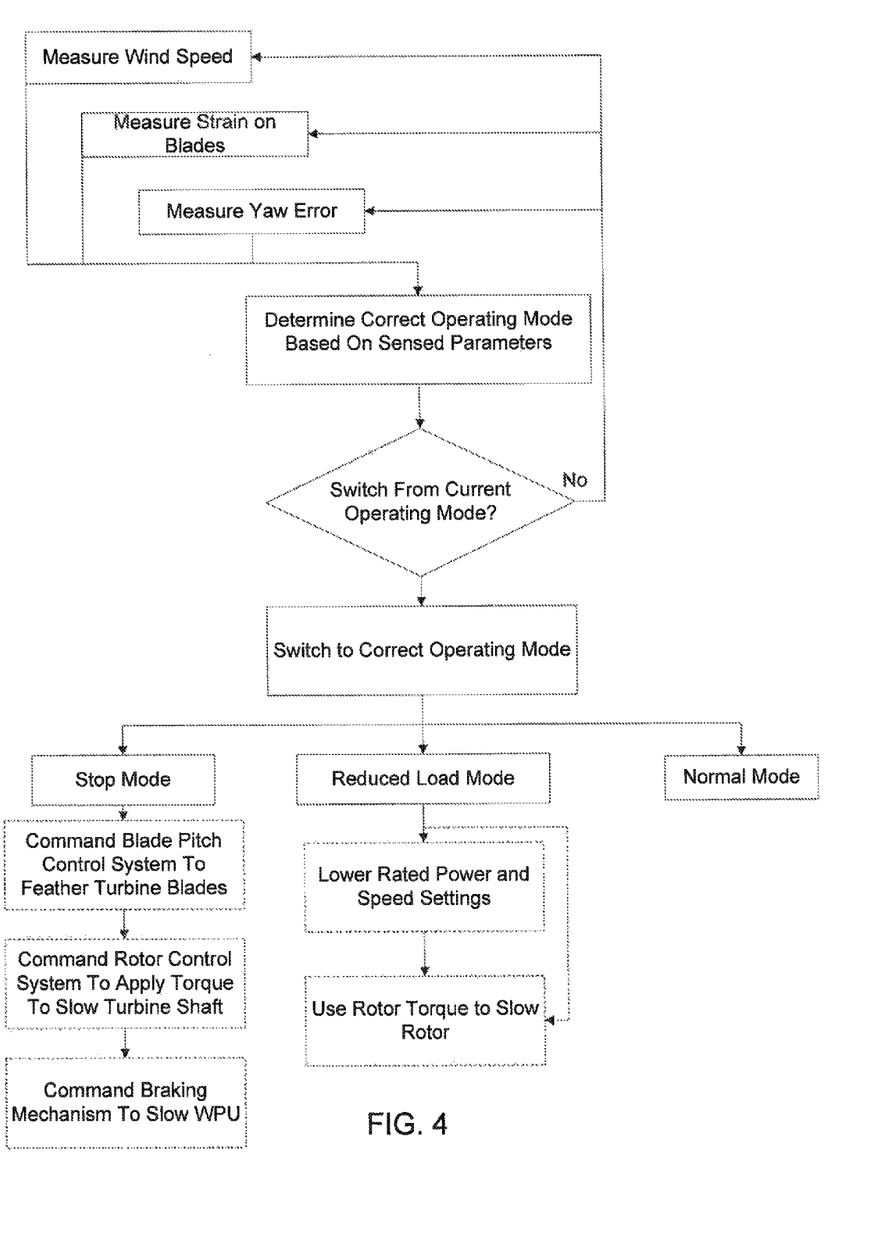
FIG. 4 is a flow diagram illustrating an alternative process flow according to an alternative embodiment of the present invention.

The control system may also use other inputs to determine when the control system should enter the correct operating mode for the current environmental and operational conditions. For example, the control system could include sensors to measure loading on the blades or on the tower top. Referring now to FIG. 4, in an exemplary embodiment, the control system includes strain gauges located at the base or root section of the WPU blades in addition to wind speed and wind direction sensors. The strain gauges provide information representing the amount of strain on the blades, which has a relationship to the overall loading on the WPU. The control system may then use the information provided by these three sensors, i.e., wind direction, wind speed, and blade strain, to determine whether to enter one of the modes mentioned above. For example, the WPU may enter shutdown mode when one or some combination of the three measurements exceed predetermined values, e.g., a predetermined yaw error value, such as, but not limited to 45°, a predetermined wind speed value, such as, but not limited to, about 23 miles per hour, and/or a predetermined strain gauge value that corresponds to a load level of 20% or more above the average level at nominal rated operation.

The control system may also take into account the rate of change of yaw error in addition to the aforementioned factors or may substitute the rate of change of yaw error for one of the previously mentioned factors when determining whether to switch between the current operating mode and another mode. The yaw error change rate may, for example, lower the filtered yaw error threshold that would prompt entry into one of the modes.

Figure 5:
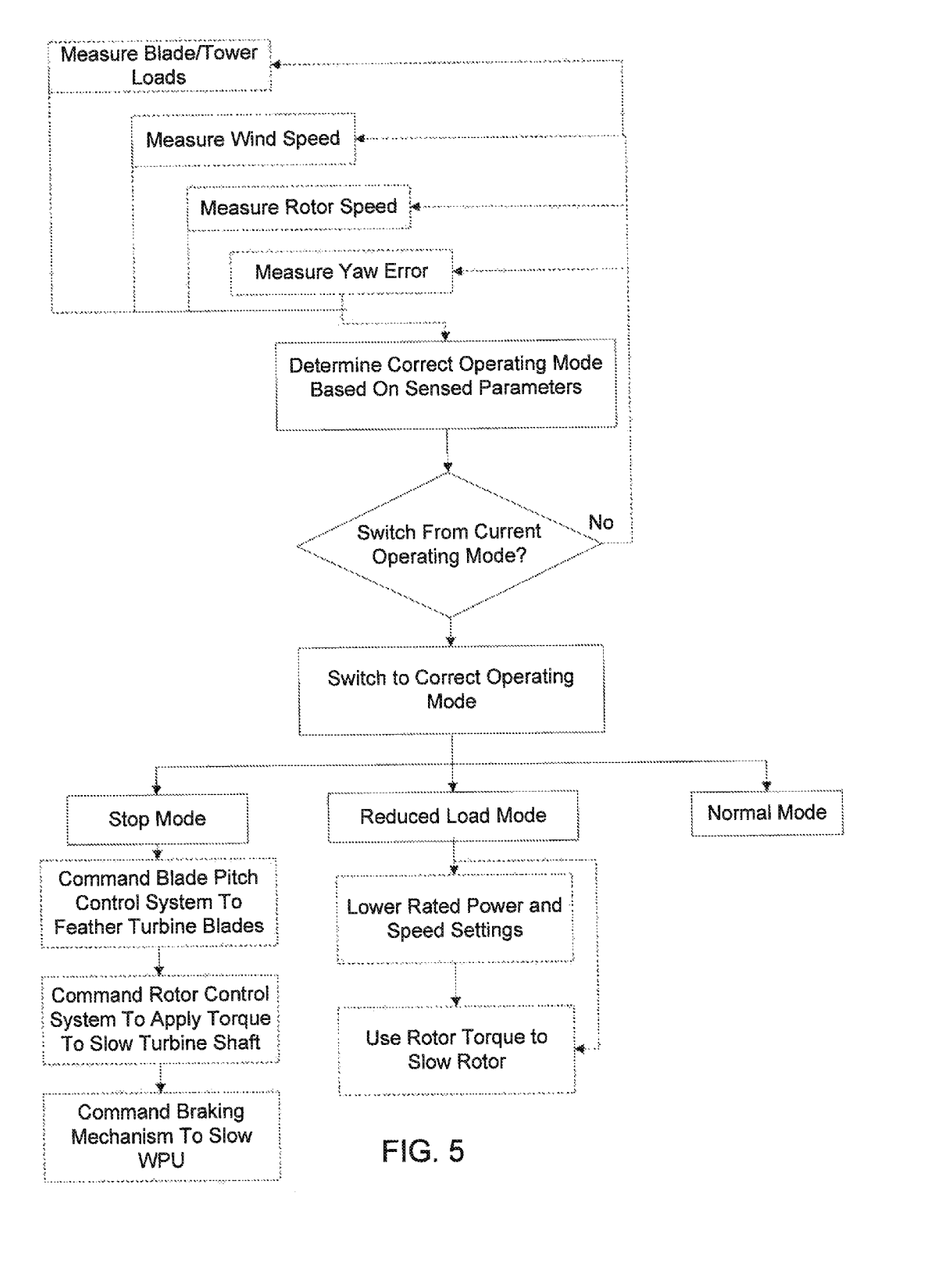
FIG. 5 is a flow diagram illustrating a further alternative process flow according to another alternative embodiment of the present invention.

As shown in FIG. 5, another alternative of the control system may use the rotor speed to determine whether, when considered with one or more of the other sensed operational or environmental conditions experienced by the WPU, e.g., wind speed, wind direction, blade loading, tower loading, etc., to indicate a need to switch from one mode to another. For example, if the WPU is operating at a higher rotor speed, the filter yaw error threshold for switching modes may be less than if, for instance, the WPU is operating at a lower rotor speed. The determination of what constitutes a high rotor speed can be made as a function of the rated rotor speed. Alternatively, the high rotor speed may be a predetermined value, that when considered with other factors, such as a predetermined maximum yaw error value and a maximum wind speed value, may prompt the control system to switch modes.

The control system may use predetermined maximum values for the yaw error, wind speed, or other factors discussed above, or, alternatively, may have a lookup table or algorithm for different combinations of the yaw error, wind speed, or other factors discussed above that determine when to enter one of the modes. For example, at a relatively low yaw error when compared to a representative predetermined yaw error of 45°, the loads on the WPU tower based on strain gauge measurements and wind speed may necessitate the entering one of the modes, such as reduced load mode. As another example, at a relatively low yaw error (when compared to the predetermined yaw error of 45°) and a relatively low strain measurement, the WPU may not require switching from the current operating mode even with a high wind speed. Other combinations, based on the values of wind speed, yaw error, blade strain, and/or rotor speed, may also indicate the need for switching to one of the modes discussed above.

It is to be noted that any one or more of the aspects and embodiments described herein may be conveniently implemented using one or more machines (e.g., one or more computing devices that are utilized as a user computing device or one or more server devices) programmed according to the teachings of the present specification. Appropriate software coding can readily be prepared by skilled programmers based on the teachings of the present disclosure. Aspects and implementations discussed above employing software and/or software modules may also include appropriate hardware for assisting in the implementation of the machine executable instructions of the software and/or software module.

Such software may be a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 6:
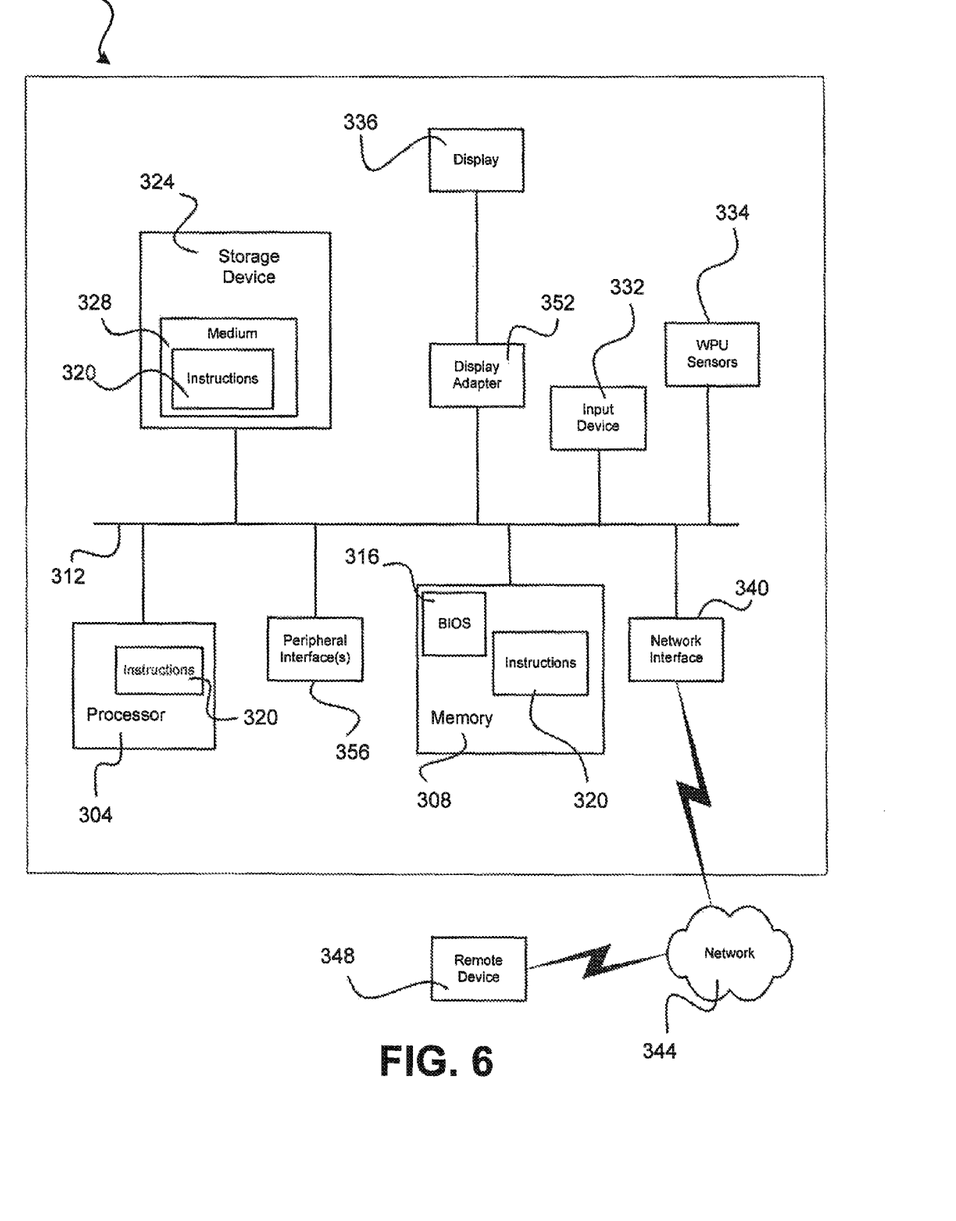
FIG. 6 is a block diagram illustrating an exemplary configuration for a control system according to an embodiment of the present invention.

FIG. 6 shows a diagrammatic representation of an embodiment of WPU control system 300, within which a set of instructions for causing the control system to switch between modes based on sensed parameters are as described in the exemplary embodiments above. It is also contemplated that multiple computing devices may be utilized to implement a specially configured set of instructions for causing the WPU control system 300 to perform any one or more of the aspects and/or methodologies of the present disclosure.

WPU control system 300 includes a processor 304 and a memory 308 that communicate with each other, and with other components, via a bus 312. Bus 312 may include any of several types of bus structures including, but not limited to, a memory bus, a memory controller, a peripheral bus, a local bus, and any combinations thereof, using any of a variety of bus architectures.

Memory 308 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 316 (BIOS), including basic routines that help to transfer information between elements within WPU control system 300, such as during start-up, may be stored in memory 308. Memory 308 may also include instructions (e.g., software) 320 embodying any one or more of the aspects and/or methodologies of the present disclosure. In another example, memory 308 may further include any number of program modules including, but not limited to, an operating system, one or more application programs, other program modules, program data, and any combinations thereof.

WPU control system 300 may also include a machine readable storage medium 324. Machine readable storage device 324 may be connected to bus 312 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, machine readable storage device 324 (or one or more components thereof) may be removably interfaced with computer system 300 (e.g., via an external port connector (not shown)). Particularly, machine readable storage device 324 and an associated machine-readable medium 328 may provide non-volatile and/or volatile storage of machine-readable instructions, data structures, program modules, and/or other data for WPU control system 300. In one example, software 320 may reside, completely or partially, within machine-readable medium 328. In another example, software 320 may reside, completely or partially, within processor 304.

WPU control system 300 may also include an input device 332. In one example, a user of WPU control system 300 may enter commands and/or other information into the WPU control system via input device 332. Examples of an input device 332 include, but are not limited to, an alpha-numeric input device (e.g., a keyboard), a pointing device, an audio input device (e.g., a microphone, a voice response system, etc.), a cursor control device (e.g., a mouse), a touchpad, an optical scanner, touchscreen, and any combinations thereof. Input device 332 may be interfaced to bus 312 via any of a variety of interfaces (not shown) including, but not limited to, a serial interface, a parallel interface, a USB interface, a FIREWIRE interface, a direct interface to bus 312, and any combinations thereof. Input device 332 may include a touch screen interface that may be a part of or separate from display 336, discussed further below. Input device 332 may be utilized as a user selection device for selecting one or more graphical representations in a graphical interface as described above.

WPU control system 300 also receives inputs from one or more WPU sensors 334, such as, but not limited to, wind direction sensors, wind speed sensors, rotor speed sensors, or strain gauges, as described above with reference to FIGS. 1 to 5.

A user may also input commands and/or other information to WPU control system 300 via storage device 324 (e.g., a removable disk drive, a flash drive, etc.) and/or network interface device 340. A network interface device 340 may be utilized for connecting WPU control system 300 to one or more of a variety of networks, such as network 344, and one or more remote devices 348 connected thereto. Examples of a network interface device 340 include, but are not limited to, a network interface card (e.g., a mobile network interface card, a LAN card), a modem, and any combination thereof. Examples of a network 344 include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Network 344 may employ a wired and/or a wireless mode of communication. In general, any network topology may be used. Information (e.g., data, software 320, etc.) may be communicated to and/or from WPU control system 300 via network interface device 340.

WPU control system 300 may further include a video display adapter 352 for communicating a displayable image to a display device, such as display 336. Examples of a display device include, but are not limited to, a liquid crystal display (LCD), a cathode ray tube (CRT), a plasma display, a light emitting diode (LED) display, and any combinations thereof. Display adapter 352 and display 336 may be utilized in combination with processor 304 to provide a graphical representation of a utility resource, a location of a land parcel, and/or a location of an easement to a user. In addition to a display device, WPU control system 300 may include one or more other peripheral output devices including, but not limited to, an audio speaker, a printer, and any combinations thereof. Such peripheral output devices may be connected to bus 312 via a peripheral interface 356. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for controlling a wind power unit, having a support structure and a control system comprising:
    controlling the wind power unit to operate in a current operating mode, said current operating mode being one of a plurality of operating modes wherein said plurality of operating modes comprises a normal operation mode and a shutdown mode, said current operating mode being selected by the control system in response to sensed parameters indicative of wind power unit state;
    sensing said parameters with a plurality of sensors;
    determining a correct operating mode corresponding to one of said plurality of operating modes based on said sensed parameters; and
    switching the wind power unit to the correct operating mode when said correct operating mode varies from the current operating mode,
    wherein the parameters comprise wind speed and yaw angle error and said determining comprises comparing the yaw angle error and wind speed to predetermined set values corresponding to at least one of said operating modes.

2. The method of claim 1, wherein the yaw angle error is directly sensed.

3. The method of claim 1, wherein the yaw angle error is calculated based on sensed wind direction and wind power unit orientation.

4. The method of claim 1, wherein said switching to the correct operating mode comprises switching from the normal operation mode to the shutdown mode.

5. The method of claim 4, wherein said switching comprises pitching the wind power unit blades to one of a feathered position or a stall position.

6. The method of claim 5, wherein said pitching comprises pitching the wind power unit blades at a rate of about 1 to 4 degrees per second.

7. The method of claim 6, wherein said rotor torque is 50-110% of a rated output torque for the wind power unit.

8. The method of claim 4, wherein said switching further comprises switching from the shutdown mode to the normal operation mode.

9. The method of claim 4, wherein said plurality of operating modes further comprises a reduced load mode and, when said current operating mode is the normal operation mode and said correct operating mode is the reduced load mode, said switching comprises applying a rotor torque to slow the wind power unit rotor.

10. The method of claim 9, wherein said switching to the reduced load mode further comprises pitching the wind power unit blades to a lower load orientation.

11. The method of claim 9, wherein said switching further comprises changing at least one of turbine power or speed limit settings to a reduced value as compared to normal operation.

12. A method for controlling a wind power unit, comprising:
operating the wind power unit in a current operating mode selected from a plurality of operating modes comprising a normal operation mode and a shutdown mode;
sensing parameters indicative of the wind power unit state;
determining a correct operating mode corresponding to one of said plurality of operating modes based on said sensed parameters;
switching the wind power unit to the correct operating mode when said correct operating mode varies from the current operating mode; and
designating the correct operating mode as the current operating mode,
wherein said parameters comprise wind speed and yaw angle error and said determining comprises:
comparing said parameters to predetermined values corresponding to selectable operating modes; and
selecting the correct operating mode based on said comparison.

13. The method of claim 12, wherein said operating modes further comprise a reduced load mode.

14. The method of claim 12, wherein said parameters comprise a further parameter based on at least one of wind power unit orientation, strain or stress in a wind power component, loading in a wind power unit component, or change in yaw angle error; and said comparing includes comparing said further parameter to predetermined values corresponding to selectable operating modes.

15. The method of claim 14, wherein said loading is determined based on sensed wind direction and wind speed.

16. The method of claim 14, wherein said loading comprises at least one of blade or blade hub loading, wind unit tower loading, or wind power unit base loading.

17. The method of claim 16, wherein said loading is calculated based on said strain or stress parameter sensed in the corresponding wind power unit component.

18. The method of claim 12, wherein said yaw angle error is calculated as a function of average wind direction and wind power unit orientation as sensed over a time interval.

19. The method of claim 12, wherein, when the current operating mode comprises the normal operation mode and the correct operating mode comprises the shutdown mode, said switching comprises pitching the wind power unit blades toward a no load position.

20. The method of claim 19, wherein said pitching occurs at a rate of less than 30% of a maximum wind power unit pitch change rate.

21. The method of claim 19, wherein the no load position comprises a feathered blade position or a stalled blade position.

22. The method of claim 19, wherein said switching further comprises applying a rotor torque to the wind power unit shaft as a function of a current shaft rotational speed, said rotor torque being in a range of 50-110% of a rated output torque for the wind power unit.

23. The method of claim 22, wherein said switching further comprises applying a rotor brake.

24. The method of claim 12, wherein the shutdown mode comprises sequentially pitching the blades toward a no load position, and applying a rotor torque to the wind power unit shaft to at least slow the rotor.

25. The method of claim 24, wherein the shutdown mode further comprises applying a rotor brake to slow and stop the rotor.

26. The method of claim 13, wherein said reduced load mode comprises sequentially lowering wind power unit power and speed settings and applying a rotor torque to the wind power unit shaft to slow the rotor while maintaining a reduced level of power generation for the wind power unit.

27. A wind power unit control system, comprising:
a wind speed sensor for providing a first value representative of a wind speed;
at least a second sensor for determining a second value representative of the yaw angle error; and
a control unit receiving inputs from said sensors and including a processor and a memory containing a set of instructions for controlling the wind power unit, wherein said set of instructions direct said processor to:
control the wind power unit to operate in a current operating mode, said current operating mode being one of a plurality of operating modes wherein said plurality of operating modes comprises a normal operation mode and a shutdown mode, said mode being selected by said control system in response to sensed parameters indicative of the wind power unit state;
determine a correct operating mode corresponding to one of said plurality of operating modes based on said first and second values; and
switch the wind power unit to said correct operating mode when said correct operating mode varies from said current operating mode,
wherein said set of instructions comprise instructions for comparing said parameters to limit values stored in memory corresponding to selectable operating modes and to select the correct operating mode based on said comparing.

28. The system of claim 27, wherein, when the current operating mode corresponds to the normal operation mode and the correct operating mode determined by the processor is the shutdown mode, said instructions to switch comprise instructions to pitch the wind power unit blades toward a no load position and to apply a rotor torque to the wind power unit shaft to at least slow the rotor.

29. The system of claim 28, wherein said instructions to switch further comprise instructions to apply a rotor brake to slow and stop the rotor.

30. The system of claim 27, wherein said plurality of operating modes further comprises a reduced load mode.

31. The system of claim 30, wherein each said operating mode corresponds to a program module containing instructions for executing said operating mode.

32. The system of claim 31, wherein:
the shutdown mode program module comprises instructions for transitioning the wind power unit to a minimum load state from each other operating mode; and the reduced load mode program module comprises instructions for transitioning the wind power unit to a reduced power generation state from each other operating mode.

33. The system of claim 30, wherein said instructions to switch to the reduced load mode comprise instructions to change wind power unit power and speed settings to values below rated value, and instructions to apply a rotor torque to slow the rotor while maintaining a reduced level of power generation at said changed settings.

34. The system of claim 27, further comprising at least one of a wind power orientation sensor, strain gauge on a wind power unit component, and a tower motion sensor communicating with said control unit and providing at least one additional value indicative of wind power unit state.

35. The system of claim 34, wherein said parameters comprise a further parameter based on at least one of wind power unit orientation, strain or stress in a wind power component, loading in a wind power unit component, or change in yaw angle error; and said instructions to compare include instructions to compare said further parameter to corresponding limit values stored in memory.

\* \* \* \* \*